(12) United States Patent
Yamamoto et al.

(10) Patent No.: US 8,276,824 B2
(45) Date of Patent: Oct. 2, 2012

(54) COMMUNICATION DEVICE, COMMUNICATION METHOD, PROGRAM, AND COMMUNICATION SYSTEM

(75) Inventors: Hideo Yamamoto, Tokyo (JP); Tadashi Morita, Tokyo (JP)

(73) Assignee: Sony Corporation, Tokyo (JP)

( * ) Notice: Subject to any disclaimer, the term of this patent is extended or adjusted under 35 U.S.C. 154(b) by 456 days.

(21) Appl. No.: 12/538,578

(22) Filed: Aug. 10, 2009

(65) Prior Publication Data

US 2010/0038425 A1 Feb. 18, 2010

(30) Foreign Application Priority Data

Aug. 13, 2008 (JP) ................................. 2008-208370

(51) Int. Cl.
*G06K 19/06* (2006.01)
(52) U.S. Cl. ....................................................... 235/492
(58) Field of Classification Search .................. 235/492, 235/487
See application file for complete search history.

(56) References Cited

FOREIGN PATENT DOCUMENTS

| JP | 06-103421 | 4/1984 |
| JP | 09-162948 | 6/1997 |
| JP | 09-179947 | 7/1997 |
| JP | 2000-099656 | 4/2000 |
| JP | 2002279359 A * | 9/2002 |
| JP | 2005-235028 | 9/2005 |
| JP | 2006-011818 | 1/2006 |
| JP | 2006-099435 | 4/2006 |
| JP | 2008-009979 | 1/2008 |

OTHER PUBLICATIONS

Japanese Office Action for corresponding JP 2008-208370 issued on Jun. 15, 2010.

* cited by examiner

*Primary Examiner* — Thien M. Le
*Assistant Examiner* — Christle Marshall
(74) *Attorney, Agent, or Firm* — K&L Gates LLP

(57) ABSTRACT

A communication device including a receiving unit, a command processing unit, an updating unit, a transmitting unit, and a selector is provided. The receiving unit receives a transmitted command. The command processing unit performs command processing in response to the received command and generates a response containing a result of the command processing. The updating unit updates information held in one area of a memory currently disabled using the result of the command processing, wherein a first area and a second area form the memory for holding information indicating a current status. The transmitting unit transmits the generated response. The selector switches the one area currently disabled and holds the information that was updated using the result of the command processing into the enabled state and the other area currently enabled into the disabled state immediately after transmission of the response is completed.

9 Claims, 10 Drawing Sheets

Prior Art

COMMUNICATION DEVICE, COMMUNICATION METHOD, PROGRAM, AND COMMUNICATION SYSTEM

CROSS REFERENCES TO RELATED APPLICATIONS

The present application claims priority to that disclosed in Japanese Priority Patent Application JP 2008-208370 filed in the Japan Patent Office on Aug. 13, 2008, the entire contents of which is hereby incorporated by reference.

BACKGROUND

The present disclosure relates to a communication device, a communication method, a program, and a communication system, and specifically, to a communication device, a communication method, a program, and a communication system preferably used in noncontact communication.

Currently, noncontact communication IC card communication technologies represented by FeliCa (registered trademark) are widely used for electronic money, tickets for transportation, etc.

FIG. 1 shows an example of an existing configuration of a noncontact communication system for realizing noncontact communication.

The noncontact communication system 1 includes a reader/writer (hereinafter, abbreviated as "R/W") 2 and a noncontact communication IC card (hereinafter, simply referred to as "IC card") 10. In the noncontact communication system 1, a user of the IC card 10 holds the IC card 10 over the R/W 2, and thereby, drive power is generated in the IC card 10 based on electromagnetic wave from the R/W 2 and data communication is performed.

The IC card 10 includes an antenna 11 for transmission and reception of electromagnetic wave, a receiving unit 12 that receives a command from the R/W 2, a command processing unit 13 that performs processing in response to the command, an updating unit 14 that updates data recorded in a nonvolatile memory 16 according to a result of the command processing unit 13, a selector 15 that indicates an enabled area of the nonvolatile memory 16, the nonvolatile memory 16 divided into areas A, B, and a transmitting unit 17 that transmits a response to the R/W 2.

In the nonvolatile memory 16, for example, when the IC card 10 is used as electronic money, available amount of money (remaining amount of money) is recorded. Note that, for ensuring atomicity of data recorded in the nonvolatile memory 16, the nonvolatile memory 16 is divided into areas A, B, and one is enabled and the other is disabled.

Further, data update is performed in this manner that data is read out from the enabled area and changed into new data (updated), and the changed (updated) data is written in the disabled area. Then, the area that has been disabled in which the changed (updated) data was written is enabled and the area that has been enabled is disabled.

A method of dividing a memory into plural areas and enabling one and disabling the others for ensuring atomicity of data recorded in the memory is related art as disclosed in JP-A-2005-235028, for example.

The selector 15 holds information indicating which of the areas A, B is enabled (disabled), however, the nonvolatile memory 16 itself may hold the information.

Next, an operation of the IC card 10 will be described by taking the case where the IC card 10 is used as electronic money for example with reference to a flowchart in FIG. 2.

When a user of the IC card 10 purchases a product, if the user holds the IC card 10 over the R/W 2 installed in a store, a command is transmitted from the R/W 2 to the IC card 10. The command contains price information (e.g., \100) of the product.

In the IC card 10, at step S1, the receiving unit 12 receives the command from the R/W 2 and supplies the received command to the command processing unit 13.

At step S2, the command processing unit 13 reads out information of the remaining amount of money (e.g., \1,000) of electronic money from the enabled area of the areas A, B of the nonvolatile memory 16 via the updating unit 14 and the selector 15. Further, the command processing unit 13 subtracts the price of the purchased product from the read out remaining amount of money, generates information indicating the updated remaining amount of money (in this case, \900), and outputs it to the updating unit 14. Furthermore, the command processing unit 13 generates a response to the R/W 2 and outputs it to the transmitting unit 17. The response contains the information indicating the updated remaining amount of money.

Moreover, at step S3, the updating unit 14 overwrites (updates) the information indicating the updated remaining amount of money in the currently disabled area of the areas A, B of the nonvolatile memory 16 via the selector 15. After the overwriting is completed, the updating unit 14 controls the selector 15 to enable the area that has been disabled and in which rewriting was performed, and oppositely disable the area that has been enabled.

Then, at step S4, the command processing unit 13 transmits the response to the transmitting unit 17. This is the end of the operation of the IC card 10.

On the other hand, the R/W 2 recognizes the completion of payment by receiving the response from the IC card 10, and the operation of the R/W 2 for purchasing the product is ended.

However, in the above described operation of the IC card 10, for example, if the IC card 10 is moved away from the R/W 2 and power supply in the IC card 10 is disconnected after the processing at step S3 is ended and before the processing at step S4 is ended, a situation that the payment is completed at the IC card 10 side but the payment is not completed at the R/W 2 side may occur.

Here, the status that the payment is completed at the IC card 10 side refers to a status that the price of the product has been subtracted from the remaining amount of money, the information has been overwritten in one area of the nonvolatile memory 16, and the area has been enabled.

In the situation, a mechanism in which the payment processing is properly completed at both sides of the IC card 10 and the R/W 2 if the user holds the IC card 10 over the R/W 2 again is established. However, if the user does not execute this (hold the IC card 10 over the R/W 2 again), the user may not be able to obtain the product despite that the product price is taken from the remaining amount of money of the IC card 10.

Thus, it is desirable, in a noncontact communication system, to suppress the occurrence of the situation that the payment is completed at the IC card side but the payment is not completed at the R/W 2 side

SUMMARY

A first embodiment is directed to a communication device including receiving means for receiving a transmitted command, command processing means for performing command processing in response to the received command and generates a response containing a result of the command processing, updating means for updating information held in one area currently disabled, out of a first area and a second area, using the result of the command processing, the first area and the second area forming a memory for holding information indicating a current status, transmitting means for transmitting the generated response, and switching means for switching, out of the first area and the second area of the memory, the one area currently disabled and holding the information that was updated using the result of the command processing into the enabled state and the other area currently enabled into the disabled state immediately after transmission of the response is completed.

The switching means may switch, out of the first area and the second area of the memory, the one area currently disabled and holding the information that was updated using the result of the command processing into the enabled state and the other area currently enabled into the disabled state dynamically according to a response length of the response immediately after transmission of the response is completed.

The communication device according to the first embodiment may further include interrupt processing means for detecting that the transmitting means finishes reading out the response from a transmission buffer in which the response has been held before transmission, and the switching means may switch, of the first area and the second area of the memory, the one area currently disabled and holding the information that was updated using the result of the command processing into the enabled state and the other area currently enabled into the disabled state according to an instruction from the interrupt processing means.

The transmitting means may provide a notification that transmission of the response is completed to the switching means, and the switching means may switch, out of the first area and the second area of the memory, the one area currently disabled and holding the information that was updated using the result of the command processing into the enabled state and the other area currently enabled into the disabled state according to the notification from the transmitting means.

The transmitting means may have a transmission completion flag indicating that transmission of the response is completed, and the switching means may switch, of the first area and the second area of the memory, the one area currently disabled and holding the information that was updated using the result of the command processing into the enabled state and the other area currently enabled into the disabled state according to a status of the transmission completion flag.

A communication method according to the first embodiment is a communication method of a communication device that performs command processing in response to a received command and transmits a response containing a result of the command processing, and includes the steps of: receiving a transmitted command, performing command processing in response to the received command and generating a response containing a result of the command processing, updating information held in one area currently disabled, out of a first area and a second area, using the result of the command processing, the first area and the second area forming a memory for holding information indicating a current status, transmitting the generated response, and switching, out of the first area and the second area of the memory, the one area currently disabled and holding the information that was updated using the result of the command processing into the enabled state and the other area currently enabled into the disabled state immediately after transmission of the response is completed.

A program according to the first embodiment is a program for controlling a communication device that performs command processing in response to a received command and transmits a response containing a result of the command processing, and allows a computer of the communication device to execute processing including the steps: receiving a transmitted command, performing command processing in response to the received command and generating a response containing a result of the command processing, updating information held in one area currently disabled, out of a first area and a second area, using the result of the command processing, the first area and the second area forming a memory for holding information indicating a current status, transmitting the generated response, and switching, out of the first area and the second area of the memory, the one area currently disabled and holding the information that has been updated using the result of the command processing into the enabled state and the other area currently enabled into the disabled state immediately after transmission of the response is completed.

In the first embodiment, command processing in response to a received command is performed and a response containing a result of the command processing is generated. Further, information held in one area currently disabled, out of a first area and a second area, is updated using the result of the command processing, and the first area and the second area forming a memory for holding information indicating a current status, and the generated response is transmitted. Furthermore, the one area currently disabled and holding the information that was updated using the result of the command processing, out of the first area and the second area of the memory, is switched into the enabled state and the other area currently enabled is switched into the disabled state immediately after transmission of the response is completed.

A second aspect of the embodiment is directed to a communication system that performs noncontact communication between a communication device and a reader/writer, and the communication device includes receiving means for receiving a transmitted command, command processing means for performing command processing in response to the received command and generates a response containing a result of the command processing, updating means for updating information held in one area currently disabled, out of a first area and a second area, using the result of the command processing, the first area and the second area forming a memory for holding information indicating a current status, transmitting means for transmitting the generated response, and switching means for switching, out of the first area and the second area of the memory, the one area currently disabled and holding the information that was updated using the result of the command processing into the enabled state and the other area currently enabled into the disabled state immediately after transmission of the response is completed, and the reader/writer includes transmitting means for transmitting the command, and receiving means for receiving the response.

In the second embodiment, a command is transmitted by the reader/writer, command processing in response to a received command is performed and a response containing a result of the command processing is generated by the communication device. Further, information held in one area currently disabled, out of a first area and a second area, is updated using the result of the command processing, and the first area and the second area forming a memory for holding information indicating a current status, the generated response is transmitted, and the response is received by the reader/writer. Furthermore, the one area currently disabled and holding the information that was updated using the result of the command processing, out of the first area and the second area of the memory, is switched into the enabled state and the other area currently enabled is switched into the disabled state by the communication device immediately after transmission of the response is completed.

According to the first embodiment, payment can be prevented from being completed before transmission of a response to an R/W.

Further, according to the first embodiment, in the noncontact communication system, a situation that payment is completed at an IC card side but the payment is not completed at an R/W side can be prevented from occurring.

According to the second embodiment, a situation that payment is completed at an IC card side but the payment is not completed at an R/W side can be prevented from occurring.

Additional features and advantages are described herein, and will be apparent from the following Detailed Description and the figures.

DETAILED DESCRIPTION

Hereinafter, specific embodiments will be described in detail with reference to the drawings.

Figure 3:
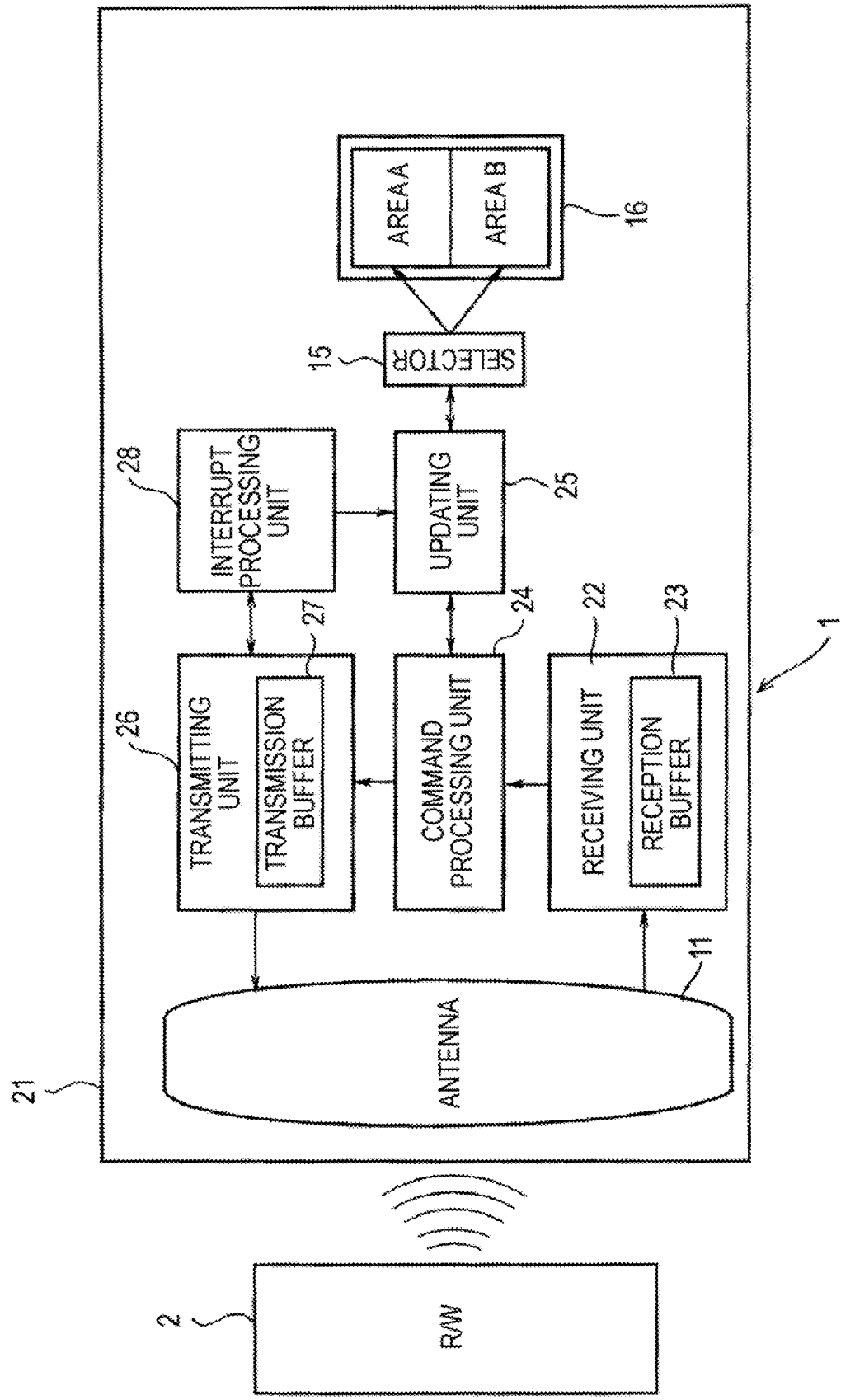
FIG. 3 is a block diagram showing a first configuration example of IC card to which the embodiment is applied.
Figure 4:
FIG. 4 shows a data structure of a command.

FIG. 3 shows a configuration example of noncontact communication system, and specifically shows a first configuration example of noncontact communication IC card (hereinafter, referred to as "IC card") as an embodiment.

Figure 1:
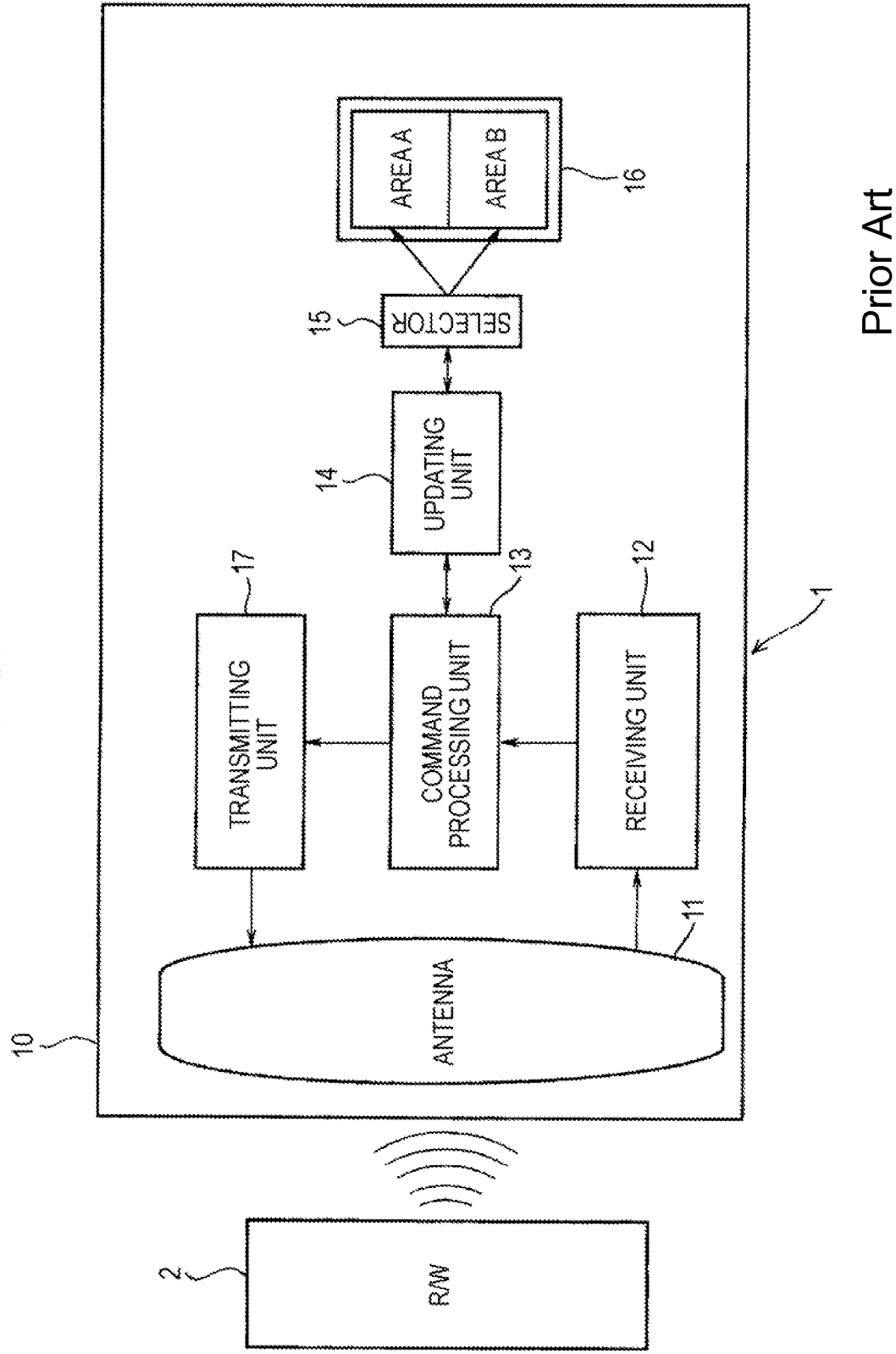
FIG. 1 shows an example of the configuration of a noncontact communication system.
Figure 2:
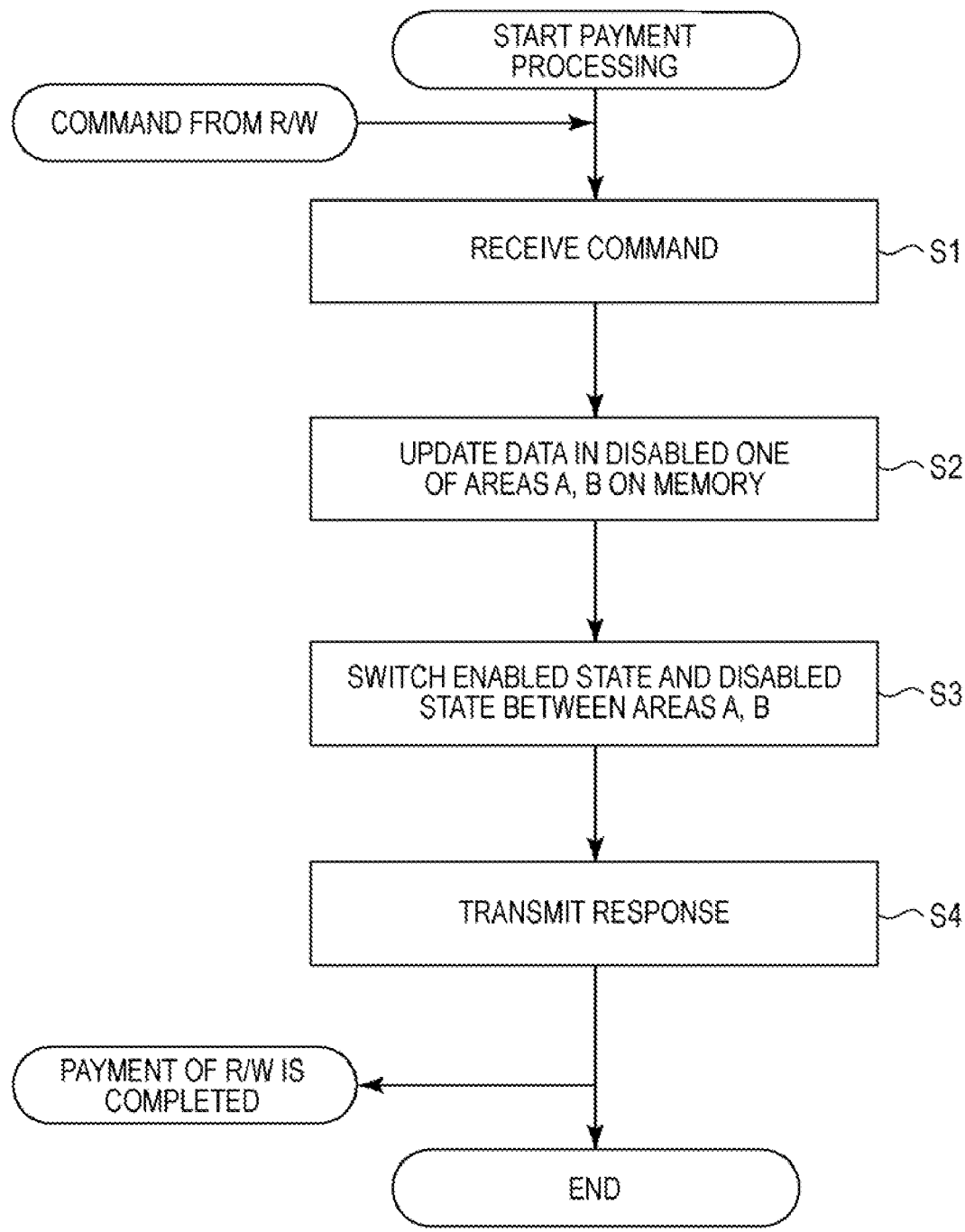
FIG. 2 is a flowchart for explanation of payment processing using an IC card in related art.

The component elements that the IC card 21 and the IC card 10 in related art shown in FIG. 1 have in common are indicated by the same numerals and the explanation thereof will appropriately be omitted.

The IC card 21 includes an antenna 11, a receiving unit 22, a command processing unit 24, an updating unit 25, a selector 15, a nonvolatile memory 16, a transmitting unit 26, and an interrupt processing unit 28.

The receiving unit 22 contains a reception buffer 23, and receives a command from an R/W 2 and outputs it to the command processing unit 24.

FIG. 3 shows a data structure of the command transmitted from the R/W 2. In the command, an area LEN in which information indicating a size of the entire command (command length) is written is provided at the leading end and command data (including the price of a product, for example) is located subsequent to the area LEN.

For instance, if the size of the area LEN itself is 1 bite and information written in the area LEN is 10 bites, the receiving unit 22 receives the area LEN and grasps the command length (10 bites), then buffers data for 9 bites obtained by subtracting the size of the area LEN (1 bite) from the command length in the reception buffer 23, and outputs the command data formed on the reception buffer 23 to the command processing unit 24.

The command processing unit 24 performs processing according to the command data from the receiving unit 22 and outputs a processing result to the updating unit 25, and generates a response containing the processing result and supplies it to the transmitting unit 26.

The updating unit 25 updates data recorded in the nonvolatile memory 16 according to the processing result from the command processing unit 24.

The transmitting unit 26 holds the response supplied from the command processing unit 24 in a transmission buffer 27 contained within and reads out the data held in the transmission buffer 27 and transmits the data in order of address with predetermined timing, and thereby, transmits the response to the R/W 2.

Figure 5:
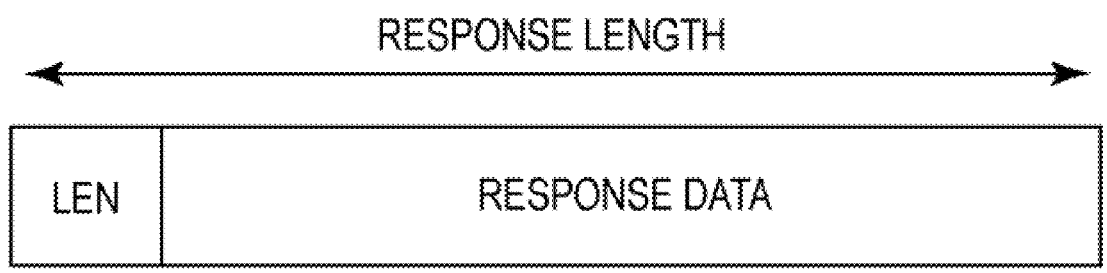
FIG. 5 shows a data structure of a response.

FIG. 5 shows a data structure generated by the command processing unit 24. Like in the command from the R/W 2, in the response, as shown in FIG. 5, an area LEN in which information indicating a size of the entire response (response length) is written is provided at the leading end and response data (including the remaining amount of money after the price of the product is taken out, for example) is located subsequent to the area LEN.

Figure 6:
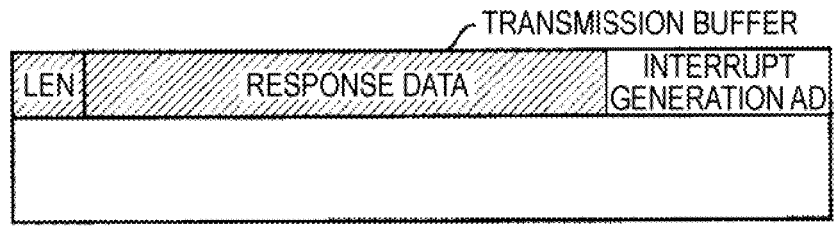
FIG. 6 shows a hold state of a response in a transmission buffer.

Further, as shown in FIG. 6, the transmitting unit 26 provides a notification of the next address to the address in which the response is held in the transmission buffer 27 to the interrupt processing unit 28 as an interrupt generation address.

The interrupt processing unit 28 monitors the readout address of the transmission buffer 27 by the transmitting unit 26, and starts interrupt processing if the next readout is the interrupt generation address. Here, the interrupt processing is processing of mainly enabling the currently disabled area of the areas A, B of the nonvolatile memory 16 and oppositely disabling the currently enabled area (details will be described later).

Figure 7:
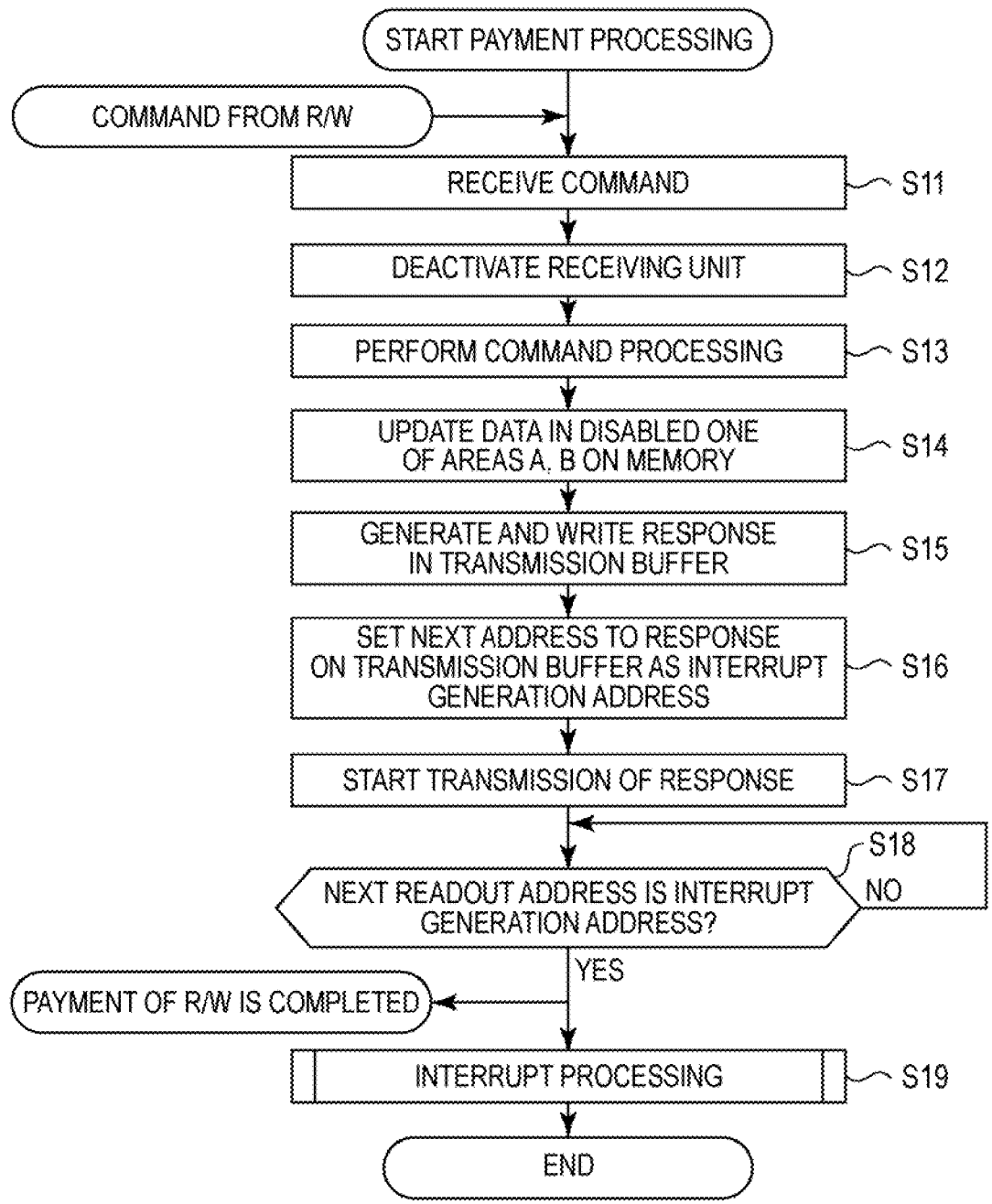
FIG. 7 is a flowchart for explanation of payment processing using the first configuration example of IC card.

Next, an operation of the IC card 21 will be described with reference to a flowchart in FIG. 7 by taking the case where the IC card 21 is used as electronic money for example.

When the user of the IC card 21 purchases a product, if the user holds the IC card 21 over the R/W 2 installed in a store, a command is transmitted from the R/W 2 to the IC card 21. The command contains price information (e.g., \100) of the product.

In the IC card 21, at step S11, the receiving unit 22 receives the command from the R/W 2 and supplies command data of the received command to the command processing unit 24.

At step S12, the command processing unit 24 deactivates the receiving unit 22. Thereby, if a new command is transmitted from the R/W 2, the receiving unit 22 will not receive it.

At step S13, the command processing unit 24 performs command processing in response to the command. That is, the command processing unit 24 reads out information of the remaining amount of money (e.g., \1,000) of electronic money from the enabled area of the areas A, B of the nonvolatile memory 16 via the updating unit 25 and the selector 15. Further, the command processing unit 24 subtracts the price of the purchased product from the read out remaining amount of money, generates information indicating the updated remaining amount of money (in this case, \900), and outputs it to the updating unit 25.

At step S14, the updating unit 25 overwrites (updates) the information indicating the updated remaining amount oft money as the command processing result in the currently disabled area of the areas A, B of the nonvolatile memory 16 via the selector 15.

At step S15, the command processing unit 24 generates a response containing the information indicating the updated remaining amount of money as the command processing result outputs it to the transmitting unit 26. The transmitting unit 26 holds the input response in the transmission buffer 27.

At step S16, the transmitting unit 26 provides a notification of the next address to the address in which the response is held in the transmission buffer 27 to the interrupt processing unit 28 as an interrupt generation address. In response to the notification, the interrupt processing unit 28 starts monitoring the readout address when the transmitting unit 26 reads out the data from the transmission buffer 27.

At step S17, the transmitting unit 26 reads out the response from the transmission buffer 27 and starts transmission thereof.

At step S18, the interrupt processing unit 28 waits until the address (readout address) of the transmission buffer 27 subsequently read out by the transmitting unit 26 matches the interrupt generation address. During the waiting, the transmitting unit 26 sequentially reads out and transmits the data forming the response from the transmission buffer 27 in order of address. Then, when the transmitting unit 26 finishes transmission of the response, the address (readout address) of the transmission buffer 27 subsequently read out by the transmitting unit 26 matches the interrupt generation address, and the processing is moved to step S19.

Further, concurrently, the R/W 2 at the other end of communication receives the response from the IC card 21 and recognizes the completion of payment, and the operation of the R/W 2 for the product purchase is ended.

At step S19, the interrupt processing unit 28 performs the interrupt processing. Thereby; the operation of the IC card 21 is ended.

Figure 8:
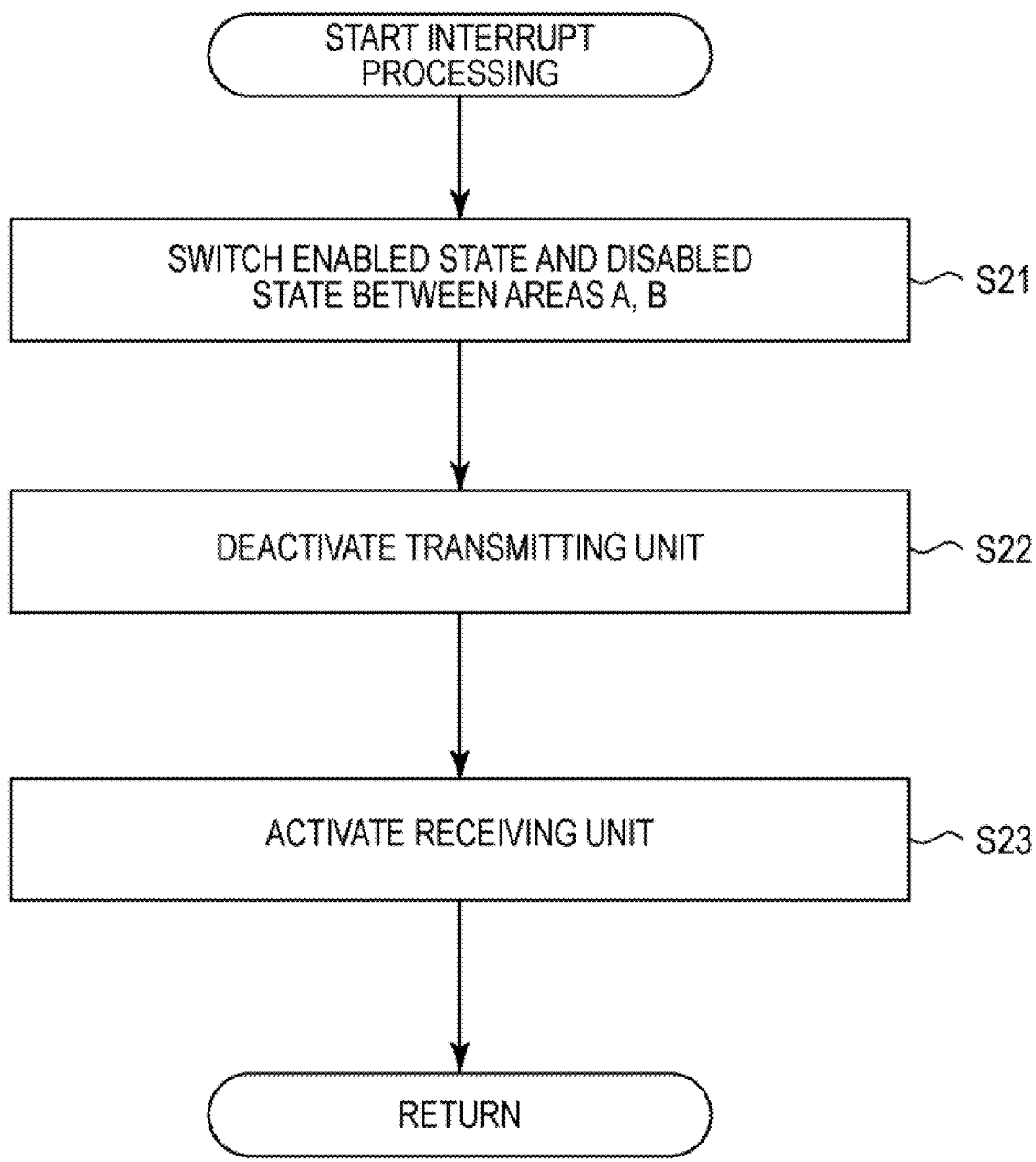
FIG. 8 is a flowchart for explanation of interrupt processing at step S19 in FIG. 7.

Here, the interrupt processing at step S19 will be described by referring to a flowchart in FIG. 8.

At step S21, the updating unit 25 controls the selector 15 to enable one of the areas A, B that has been disabled in which rewriting has been performed in the processing at step S14, and oppositely disable the other of the areas A, B that has been enabled.

The time taken for switching between enabled and disabled states by the selector 15 is very short compared to the time taken for transmission of the response. Therefore, the possibility that the switching between enabled and disabled states by the selector 15 is not completed by disconnection to power supply, or the like is very low.

Then, the updating unit 25 provides a notification that switching of enabled and disabled states between the areas A and B of the nonvolatile memory 16 is finished to the command processing unit 24.

In response to the notification, at step S22, the command processing unit 24 deactivates the transmitting unit 26. Further, at step S23, the command processing unit 24 activates the receiving unit 22. Thereby, the receiving unit 22 will receive a new command from the R/W 2. That is, the IC card 21 will handle new communication with the R/W 2. This is the end of the interrupt processing.

As described above, according to the IC card 21, switching between enabled and disabled states by the selector 15 is quickly performed dynamically according to the response length immediately after the transmission of the response, and thus, the inconvenient situation that the payment is completed at the IC card 21 side but the payment is not completed at the R/W 2 side can be prevented from occurring.

Figure 9:
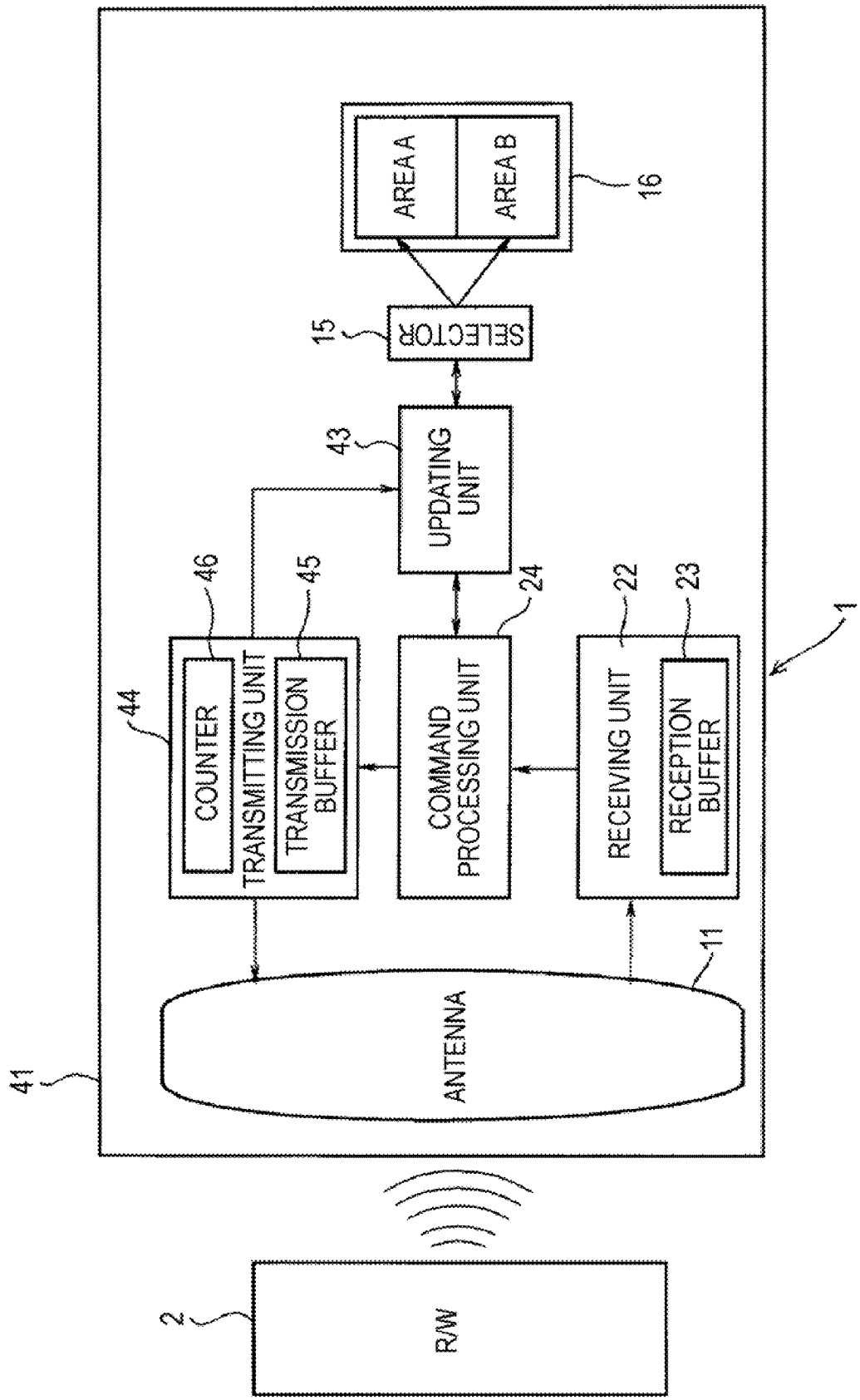
FIG. 9 is a block diagram showing an embodiment of a second configuration example of IC card.

Next, FIG. 9 shows a second configuration example of IC card as an embodiment.

The component elements that the IC card 41 as the second configuration example and the IC card 21 as the first configuration example shown in FIG. 3 have in common are indicated by the same numerals and the explanation thereof will appropriately be omitted.

That is, the IC card 41 includes an antenna 11, a receiving unit 22, a command processing unit 24, an updating unit 43, a selector 15, a nonvolatile memory 16, and a transmitting unit 44.

The updating unit 43 updates data recorded in the nonvolatile memory 16 according to the processing result from the command processing unit 24. Further, the updating unit 43 performs the same interrupt processing as that by the interrupt processing unit 28 in FIG. 3 in response to a predetermined notification from the transmitting unit 44, which will be described later.

The transmitting unit 44 holds the response supplied from the command processing unit 24 in a transmission buffer 45 contained within and reads out the data held in the transmission buffer 45 and transmits the data in order of address with predetermined timing, and thereby, transmits the response to the R/W 2.

Further, the transmitting unit 44 contains a counter 46 that counts down the data of the transmission buffer 45 at each time of transmission of one bite, sets the counter 46 to a value indicated by the response length before transmission of the response, and, when the value of the counter 46 becomes zero, provides a notification of that to the updating unit 43. In response to the notification, the updating unit 43 starts interrupt processing.

Figure 10:
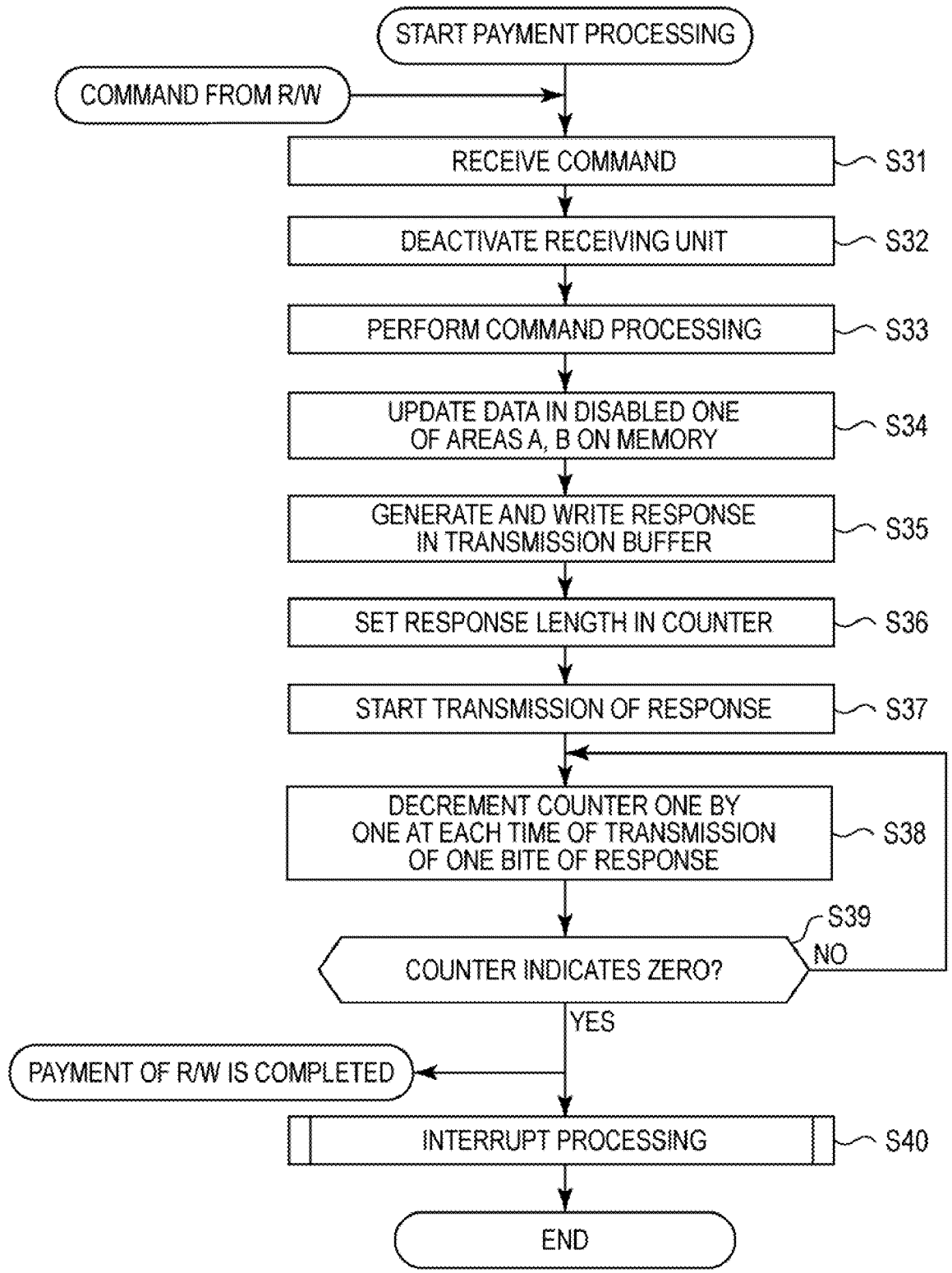
FIG. 10 is a flowchart for explanation of payment processing using the second configuration example of IC card.

An operation of the IC card 41 will be described with reference to a flowchart in FIG. 10 by taking the case where the IC card 41 is used as electronic money for example.

When the user of the IC card 41 purchases a product, if the user holds the IC card 41 over the R/W 2 installed in a store, a command is transmitted from the R/W 2 to the IC card 41. The command contains price information (e.g., \100) of the product.

In the IC card 41, at step S31, the receiving unit 22 receives the command from the R/W 2 and supplies command data of the received command to the command processing unit 24.

At step S32, the command processing unit 24 deactivates the receiving unit 22. Thereby, if a new command is transmitted from the R/W 2, the receiving unit 22 will not receive it.

At step S33, the command processing unit 24 performs command processing in response to the command. That is, the command processing unit 24 reads out information of the remaining amount of money (e.g., \1,000) of electronic money from the enabled area of the areas A, B of the nonvolatile memory 16 via the updating unit 43 and the selector 15. Further, the command processing unit 24 subtracts the price of the purchased product from the read out remaining amount of money, generates information indicating the updated remaining amount of money (in this case, \900), and outputs it to the updating unit 43.

At step S34, the updating unit 43 overwrites (updates) the information indicating the updated remaining amount of money as the command processing result in the currently disabled area of the areas A, B of the nonvolatile memory 16 via the selector 15.

At step S35, the command processing unit 24 generates a response containing the information indicating the updated remaining amount of money as the command processing result and outputs it to the transmitting unit 44. The transmitting unit 44 holds the input response in the transmission buffer 45.

At step S36, the transmitting unit 44 acquires a value of the response length of the response held in the transmission buffer 45 and sets the acquired value in the counter 46 contained therein.

At step S37, the transmitting unit 44 reads out the response by one bite at a time from the transmission buffer 45 and starts transmission thereof At step S38, the counter 46 decrements its value (count value) one by one at each time of readout of the response held in the transmission buffer 45. At step S39, the transmitting unit 44 determines whether the count value becomes zero or not. Then, the processing at steps S38 and S39 are repeated until the unit determines that the count value becomes zero.

Then, at step S39, if the transmitting unit 44 determines that the count value becomes zero, the unit provides a notification of that to the updating unit 43.

Concurrently, the R/W 2 at the other end of communication receives the response from the IC card 21 and recognizes the completion of payment, and the operation of the R/W 2 for the product purchase is ended.

In response to the notification from the transmitting unit 44, at step S40, the updating unit 43 executes interrupt processing. Specifically, the processing is the same as the interrupt processing that has been described in FIG. 8, and the explanation there of will be omitted. Thereby, the operation of the IC card 41 is ended.

As described above, according to the IC card 41, switching between enabled and disabled states by the selector 15 is quickly performed dynamically according to the response length immediately after the transmission of the response. Thus, the inconvenient situation that the payment is completed at the IC card 41 side but the payment is not completed at the R/W 2 side can be prevented from occurring.

Figure 11:
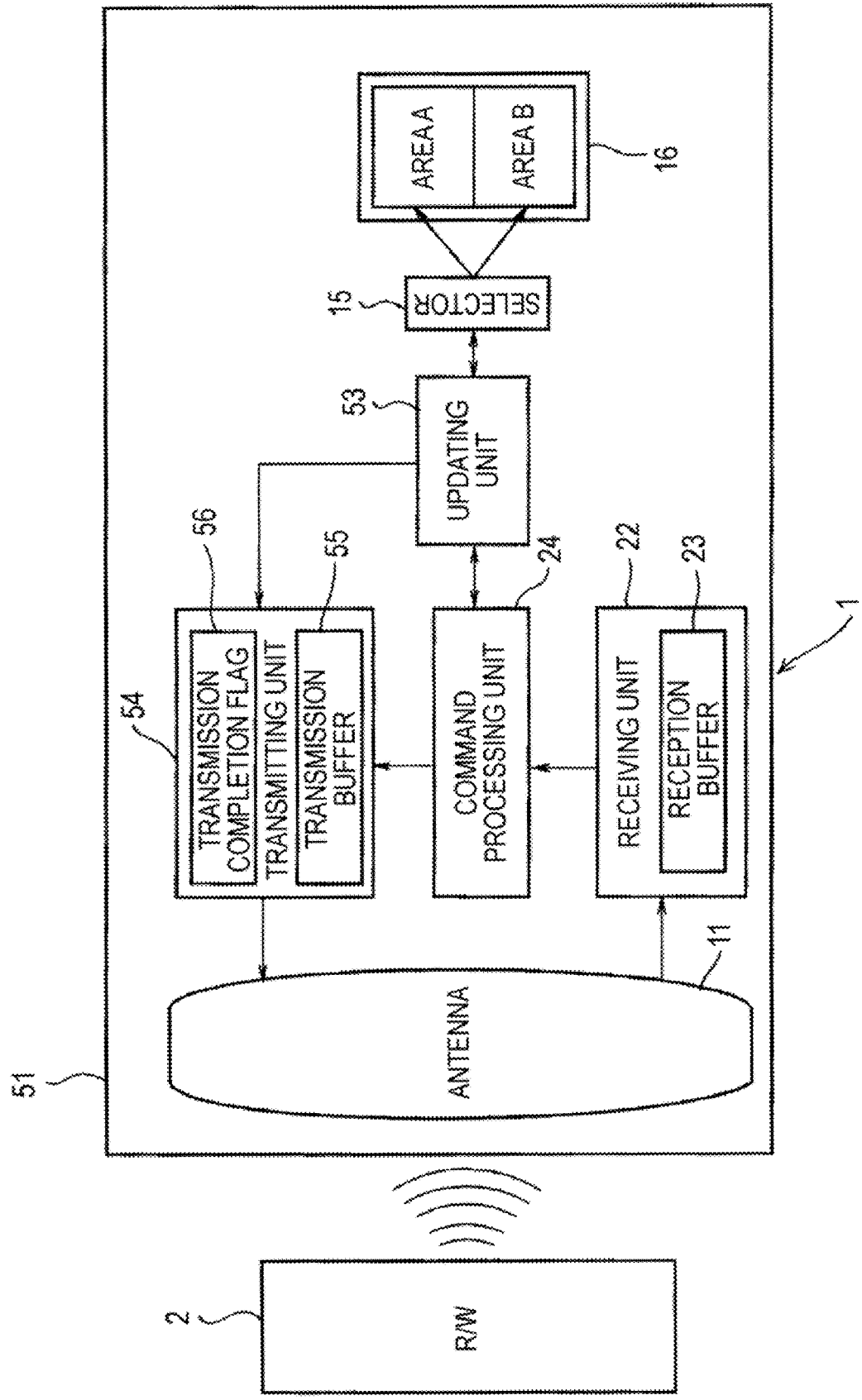
FIG. 11 is a block diagram showing an embodiment of a third configuration example of IC card.

Next, FIG. 11 shows a third configuration example of IC card as an embodiment.

The component elements that the IC card 41 as the second configuration example and the IC card 21 as the first configuration example shown in FIG. 3 have in common are indicated by the same numerals and the explanation thereof will appropriately be omitted.

That is, the IC card 51 includes an antenna 11, a receiving unit 22, a command processing unit 24, an updating unit 53, a selector 15, a nonvolatile memory 16, and a transmitting unit 54.

The updating unit 53 updates data recorded in the nonvolatile memory 16 according to the processing result from the command processing unit 24. Further, the updating unit 53 confirms (polls) a transmission completion flag 56 of the transmitting unit 54 and thereby determines whether the response is transmitted or not, and performs the same interrupt processing as that by the interrupt processing unit 28 in FIG. 3 in response to transmission of the response.

The transmitting unit 54 holds the response supplied from the command processing unit 24 in a transmission buffer 55 contained within and reads out the data held in the transmission buffer 55 and transmits the data in order of address with predetermined timing, and thereby, transmits the response to the R/W 2.

Further, the transmitting unit 54 contains the transmission complete flag 56 indicating whether transmission of the response is completed or not. The unit is adapted to turn off the transmission complete flag 56 when the response is supplied from the command processing unit 24 and turn on the transmission complete flag 56 immediately when the transmission of the response on the transmission buffer 55 is completed.

Figure 12:
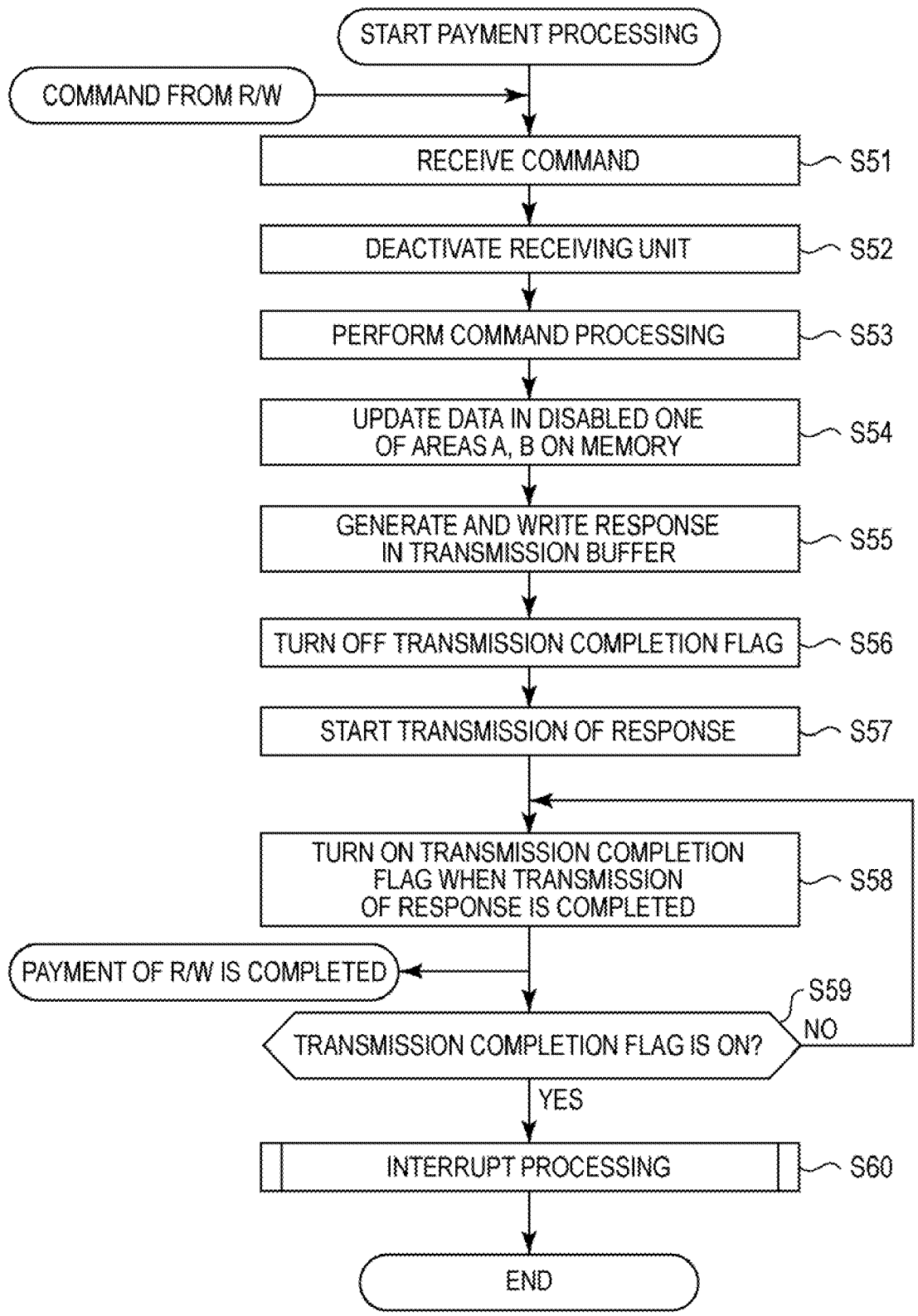
FIG. 12 is a flowchart for explanation of payment processing using the third configuration example of IC card.

An operation of the IC card 51 will be described with reference to a flowchart in FIG. 12 by taking the case where the IC card 51 is used as electronic money for example.

When the user of the IC card 51 purchases a product, if the user holds the IC card 51 over the R/W 2 installed in a store, a command is transmitted from the R/W 2 to the IC card 51. The command contains price information (e.g., \100) of the product.

In the IC card 51, at step S51, the receiving unit 22 receives the command from the R/W 2 and supplies command data of the received command lo the command processing unit 24.

At step S52, the command processing unit 24 deactivates the receiving unit 22. Thereby, if a new command is transmitted from the R/W 2, the receiving unit 22 will not receive it.

At step S53, the command processing unit 24 performs command processing in response to the command. That is, the command processing unit 24 reads out information of the remaining amount of money (e.g., \1,000) of electronic money from the enabled area of the areas A, B of the nonvolatile memory 16 via the updating unit 53 and the selector 15. Further, the command processing unit 24 subtracts the price of the purchased product from the read out remaining amount of money, generates information indicating the updated remaining amount of money (in this case, \900), and outputs it to the updating unit 53.

At step S54, the updating unit 53 overwrites (updates) the information indicating the updated remaining amount of money in the currently enabled area of the areas A, B of the nonvolatile memory 16 via the selector 15. Then, the updating unit 53 starts polling of the transmission complete flag 56 of the transmitting unit 54.

At step S55, the command processing unit 24 generates a response containing the information indicating the updated remaining amount of money as the command processing result and outputs it to the transmitting unit 54. The transmitting unit 54 holds the input response in the transmission buffer 55. At step S56, the transmitting unit 54 turns off the transmission complete flag 56.

At step S57, the transmitting unit 54 reads out the response by one bite at a time from the transmission buffer 55 and starts transmission thereof.

At step S58, the transmitting unit 54 determines whether the transmission of the response held in the transmission buffer 55 is completed or not. When the transmission of the response is completed, the unit immediately turns on the transmission complete flag 56.

Concurrently, the R/W 2 at the other end of communication receives the response from the IC card 21 and recognizes the completion of payment, and the operation of the R/W 2 for the product purchase is ended.

At step S59, the updating unit 53 determines whether the transmission complete flag 56 is on or not as a result of the polling to the transmitting unit 54 started at step S54. If the unit determines the transmission complete flag is not on, the process is returned to step S58 and the steps S58 and S59 are repeated. Then, at step S59, when the unit determines the transmission complete flag is on, the process is moved to the step S60.

At step S60, the updating unit 53 executes interrupt processing. Specifically, the processing is the same as the interrupt processing that has been described in FIG. 8, and the explanation there of will be omitted. Thereby, the operation of the IC card 51 is ended.

As described above, according to the IC card 51, since the updating unit 53 confirms the transmission complete flag 56 by polling, switching between enabled and disabled states by the selector 15 can be quickly performed dynamically according to the response length immediately after the transmission of the response. Thus, the inconvenient situation that the payment is completed at the IC card 51 side but the payment is not completed at the R/W 2 side can be prevented from occurring.

According to the IC cards 21, 41, 51 as embodiments, the processing is executed in the order of rewriting of the nonvolatile memory 16, transmission of the response, and switching of the enabled area of the nonvolatile memory 16, and thus, the inconvenient situation that the payment is completed at the IC card side but the payment is not completed at the R/W 2 side can be prevented from occurring.

The embodiments of the present application can be applied not only to the IC card but to a cellular phone containing an IC chip equal to the IC card.

Further, the above described series of processings may be executed by hardware or software. When the series of processings is executed by software, a program configuring the software is installed from a program recording medium into a computer incorporated in dedicated hardware.

Note that the program executed by a computer may be a program in which processing is performed in the order as has been described in this specification in the temporal sequence or a program in which processing is performed in parallel or with timing when the processing is necessary such that a call is requested.

Further, the program may be processed by one computer or distributed-processed by plural computers. Furthermore, the program may be transferred to a remote computer and executed.

In this specification, the system represents the entire apparatus formed by plural devices.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such chances and modifications be covered by the appended claims.

The invention is claimed as follows:

1. A communication device comprising:
receiving means for receiving a transmitted command;
command processing means for performing command processing in response to the received command and generates a response containing a result of the command processing;
updating means for updating information held in one area currently disabled, out of a first area and a second area, using the result of the command processing, the first area and the second area forming a memory for holding information indicating a current status;
transmitting means for transmitting the generated response; and
switching means for switching, out of the first area and the second area of the memory, the one area currently disabled and holding the information that was updated using the result of the command processing into the enabled state and the other area currently enabled into the disabled state dynamically according to a response length of the response immediately after transmission of the response is completed; and
wherein the switching means switches, out of the first area and the second area of the memory, the one area currently disabled and holding the information that was updated using the result of the command processing into the enabled state and the other area currently enabled into the disabled state dynamically according to a response length of the response immediately after transmission of the response is completed.

2. The communication device according to claim 1, further comprising interrupt processing means for detecting that the transmitting means finishes reading out the response from a transmission buffer in which the response has been held before transmission, wherein the switching means switches, out of the first area and the second area of the memory, the one area currently disabled and holding the information that was updated using the result of the command processing into the enabled state and the other area currently enabled into the disabled state according to an instruction from the interrupt processing means.

3. The communication device according to claim 1, wherein the transmitting means provides a notification that transmission of the response is completed to the switching means, and
the switching means switches, out of the first area and the second area of the memory, the one area currently disabled and holding the information that was updated using the result of the command processing into the enabled state and the other area currently enabled into the disabled state according to the notification from the transmitting means.

4. The communication device according to claim 1, wherein the transmitting means has a transmission completion flag indicating that transmission of the response is completed, and
the switching means switches, out of the first area and the second area of the memory, the one area currently disabled and holding the information that was updated using the result of the command processing into the enabled state and the other area currently enabled into the disabled state according to a status of the transmission completion flag.

5. A communication method of a communication device that performs command processing in response to a received command and transmits a response containing a result of the command processing, the method comprising:
receiving a transmitted command;
performing command processing in response to the received command and generating a response containing a result of the command processing;
updating information held in one area currently disabled, out of a first area and a second area, using the result of the command processing, the first area and the second area forming a memory for holding information indicating a current status;
transmitting the generated response; and
switching, out of the first area and the second area of the memory, the one area currently disabled and holding the information that was updated using the result of the command processing into the enabled state and the other area currently enabled into the disabled state dynamically according to a response length of the response immediately after transmission of the response is completed.

6. A non-transitory computer readable storage medium storing a computer program for controlling a communication device that performs command processing in response to a received command and transmits a response containing a result of the command processing, and allowing a computer of the communication device to execute processing, the program causing the communication device to:

receive a transmitted command;

perform command processing in response to the received command and generating a response containing a result of the command processing;

update information held in one area currently disabled, out of a first area and a second area, using the result of the command processing, the first area and the second area forming a memory for holding information indicating a current status;

transmit the generated response; and switch, out of the first area and the second area of the memory, the one area currently disabled and holding the information that was updated using the result of the command processing into the enabled state and the other area currently enabled into the disabled state dynamically according to a response length of the response immediately after transmission of the response is completed.

7. A communication system that performs noncontact communication between a communication device and a reader/writer, wherein the communication device includes receiving means for receiving a transmitted command, command processing means for performing command processing in response to the received command and generates a response containing a result of the command processing, updating means for updating information held in one area currently disabled, out of a first area and a second area, using the result of the command processing, the first area and the second area forming a memory for holding information indicating a current status, transmitting means for transmitting the generated response, and switching means for switching, out of the first area and the second area of the memory, the one area currently disabled and holding the information that was updated using the result of the command processing into the enabled state and the other area currently enabled into the disabled state dynamically according to a response length of the response immediately after transmission of the response is completed, and the reader/writer includes transmitting means for transmitting the command, and receiving means for receiving the response.

8. A communication device comprising:

a receiving unit configured to receive a transmitted command, a command processing unit configured to perform command processing in response to the received command and generates a response containing a result of the command processing;

an updating unit configured to update information held in one area currently disabled, out of a first area and a second area, using the result of the command processing, the first area and the second area forming a memory for holding information indicating a current status;

a transmitting unit configured to transmit the generated response; and a switching unit configured to switch, out of the first area and the second area of the memory, the one area currently disabled and holding the information that was updated using the result of the command processing, into the enabled state and the other area currently enabled into the disabled state dynamically according to a response length of the response immediately after transmission of the response is completed.

9. A communication system that performs noncontact communication between a communication device and a reader/writer, wherein the communication device includes a receiving unit configured to receive a transmitted command, a command processing unit configured to perform command processing in response to the received command and generates a response containing a result of the command processing, an updating unit configured to update information held in one area currently disabled, out of a first area and a second area, using the result of the command processing, the first area and the second area forming a memory for holding information indicating a current status, a transmitting unit configured to transmit the generated response, and a switching unit configured to switch, out of the first area and the second area of the memory, the one area currently disabled and holding the information that was updated using the result of the command processing into the enabled state and the other area currently enabled into the disabled state dynamically according to a response length of the response immediately after transmission of the response is completed, and the reader/writer includes a transmitting unit configured to transmit the command, and a receiving unit configured to receive the response.

* * * * *